United States Patent
Erkocak (10) Patent No.: US 11,971,739 B2
(45) Date of Patent: Apr. 30, 2024

(54) JOYSTICK WITH PRECISE CONTROL

(71) Applicant: MAKERSAN MAKINA OTOMOTIV SANAYI TICARET ANONIM SIRKETI, Kocaeli (TR)

(72) Inventor: Levent Erkocak, Kocaeli (TR)

(73) Assignee: MAKERSAN MAKINA OTOMOTIV SANAYI TICARET ANONIM SIRKETI, Kocaeli (TR)

( * ) Notice: Subject to any disclaimer, the term of this patent is extended or adjusted under 35 U.S.C. 154(b) by 279 days.

(21) Appl. No.: 17/422,188

(22) PCT Filed: Jan. 10, 2019

(86) PCT No.: PCT/TR2019/050026
§ 371 (c)(1),
(2) Date: Jul. 10, 2021

(87) PCT Pub. No.: WO2020/145911
PCT Pub. Date: Jul. 16, 2020

(65) Prior Publication Data
US 2022/0091628 A1 Mar. 24, 2022

(51) Int. Cl.
*G05G 1/00* (2006.01)
*E02F 9/20* (2006.01)
*G05G 1/04* (2006.01)
*G05G 9/047* (2006.01)
*G05G 25/04* (2006.01)
*G06F 3/033* (2013.01)

(52) U.S. Cl.
CPC ........... *G05G 9/047* (2013.01); *E02F 9/2004* (2013.01); *G05G 1/04* (2013.01); *G05G 25/04* (2013.01); *G05G 2009/04718* (2013.01); *G05G 2009/04755* (2013.01); *G06F 3/033* (2013.01)

(58) Field of Classification Search
CPC ........... G05G 1/04; G05G 9/047; G05G 25/04
See application file for complete search history.

(56) References Cited

U.S. PATENT DOCUMENTS

| 5,559,432 A * | 9/1996 | Logue | B82Y 15/00 |
| | | | 345/161 |
| 2002/0093328 A1* | 7/2002 | Maatta | G06F 1/169 |
| | | | 324/207.11 |

(Continued)

*Primary Examiner* — Roy P Rabindranath
(74) *Attorney, Agent, or Firm* — Bayramoglu Law Offices LLC (57) ABSTRACT

A joystick for controlling a machine in multi-axes includes a control portion having a body in which at least one circuit board having at least one sensor is provided; a top portion having a flexible boot forming at least partly an outer periphery of the top portion provided on the control portion; a control arm mounted on a pivotal member for pivotal movement relative to the body; wherein said control arm is made of plastic in an injection-molding operation and has an overmolded magnetic member suitable to interact with the sensor, said magnetic member provided in the proximity of the circuit board wherein said control arm has a connection portion such that said flexible boot is attached to the control arm from said connection portion. Thereby usage of the overmolded control arm which made of plastic provides sensitivity, production quality and additionally, thriving resistance to vibration.

16 Claims, 10 Drawing Sheets

(56) References Cited

U.S. PATENT DOCUMENTS

| | | | |
|---|---|---|---|
| 2009/0212766 A1* | 8/2009 | Olson | G05G 5/05 |
| | | | 324/207.2 |
| 2013/0088819 A1* | 4/2013 | Dernier | G06F 1/166 |
| | | | 361/679.01 |
| 2015/0282388 A1* | 10/2015 | Carpenter | H05K 9/0022 |
| | | | 361/720 |
| 2017/0030241 A1* | 2/2017 | Ryu | F01N 9/00 |
| 2018/0275718 A1* | 9/2018 | Hsu | G06F 1/1618 |

* cited by examiner

JOYSTICK WITH PRECISE CONTROL

CROSS REFERENCE TO THE RELATED APPLICATIONS

This application is the national phase entry of International Application No. PCT/TR2019/050026, filed on Jan. 10, 2019, the entire contents of which are incorporated herein by reference.

TECHNICAL FIELD

The present invention relates to a control device with improved construction and more specifically a joystick with increased endurance suitable to be used in tough environmental condition.

BACKGROUND

Joystick is developed for controlling vehicle application which ergonomic and safety operation, especially finger joystick provides precise control of critical function. Designing safe and simple joystick is a demand on machines with multiple high current implementations so as to expand the capabilities of motion control.

In the art, joysticks for industrial applications using various wireless technologies are known to achieve the real-time motion in which positioning the magnet within the control arm is extremely important. However, the fact that the control arms are made of metal and that the magnet is not placed in a precise position leads to inaccurate measurements due to the difficulties in manufacturing. The needs for additional operation of the magnet to attach to the metal control arm causes the cost of manufacturing.

There is continuing effort to improve the controlling devices, such as the insulation of electronic parts, physical endurance of the mechanical design or accuracy in construction. Accordingly, various joysticks have been devised which are relatively limited in design. In cases where multiple switches and rollers are coupled to a printed circuit board, upper surface of the printed circuit board is left open and thus the sealing problem cannot be solved. This may especially cause problems in non-cabin construction equipment.

A prior art publication in the technical field of the present invention may be referred to as US20042382 B among others, the document disclosing a joystick which maneuvers a utility vehicle such as excavators or construction machines. Said joystick comprises a control arm for control input of at least a first function and second function, a control ring with a maximum predetermined angle and a carrier having a holder that proposes improved ergonomics.

There is a need for a control device that can be durable to unfavorable environmental condition.

SUMMARY

Principal object of the present invention is to provide a joystick with increased reliability security.

Another object of the present invention is to provide a joystick which prevents incorrect signals generated by vibrations for motion control.

Another object of the present invention is to provide a compact, durable and precise control for a joystick.

Another object of the present invention is to provide a joystick which presents sensitive and cost effective control.

Another object of the present invention is to provide a joystick which prevents an undesired vibration by comprising required structure that retain the magnet at the same position, so that it has an increased security.

Another object of the present invention is to provide a joystick which allows easy assembly by using less parts compared to the art and provides a more secure system by eliminating dislocation of the magnet.

The present invention relates a joystick for controlling a machine in multi-axes, comprising a control portion having a body in which at least one circuit board having at least one sensor is provided; a top portion having a flexible boot forming at least partly an outer periphery of the top portion provided on the control portion; a control arm mounted on a pivotal member for pivotal movement relative to the body; wherein said control arm is made of plastic in an injection-molding operation and has an overmolded magnetic member suitable to interact with the sensor, said magnetic member provided in the proximity of the circuit board wherein said control arm has a connection portion such that said flexible boot is attached to the control arm from said connection portion. Thereby usage of the overmolded control arm which made of plastic provides sensitivity, production quality and additionally, thriving resistance to vibration.

In a possible embodiment, the connection portion is a connection hole, produced by said injection-molding operation, extending along a longitudinal direction of the control arm for receiving a portion of a fastening member which is arranged secure the control arm and the flexible boot together. Thus, an increased security joystick may be is provided.

In a possible embodiment, the joystick further comprises a sealing plate which is shaped and dimensioned to match with the circuit board and is provided on said sealing plate to provide sealing the circuit board wherein the sealing plate provides water and dust protection, and moreover a machine controlling may carry out in an efficient manner without being affected by the water and dirt in the outdoor environment.

BRIEF DESCRIPTION OF THE DRAWINGS

The figures of the subject matter, whose brief explanations are herewith provided, are solely intended for providing a better understanding of the present invention and are as such not intended to define the scope of protection or the context in which said scope is to be interpreted in the absence of the description.

Invention.

DETAILED DESCRIPTION OF THE EMBODIMENTS

Figure 1:
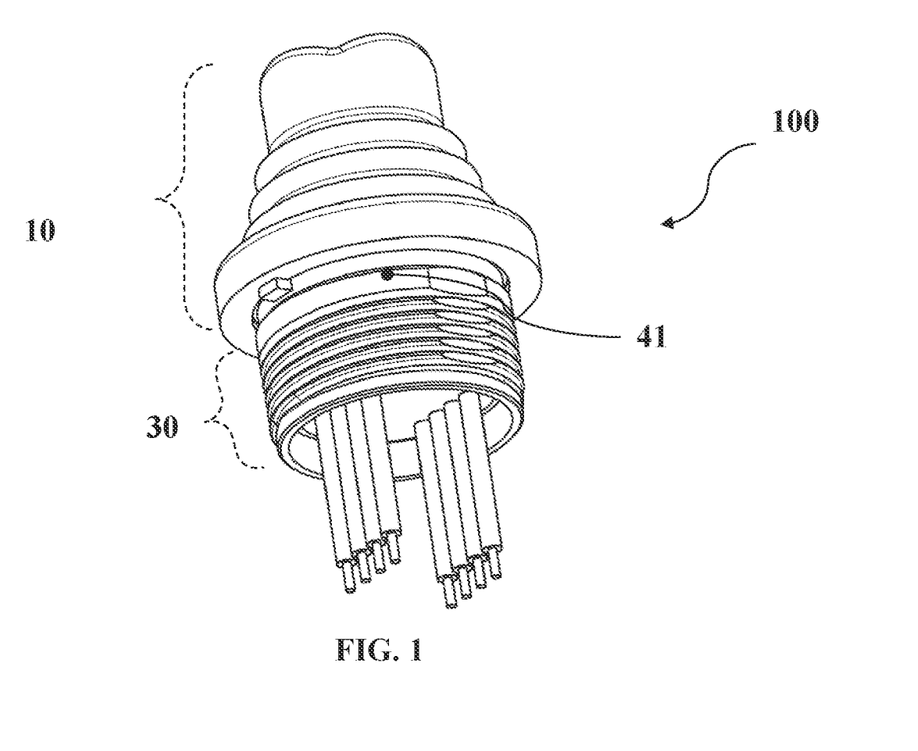
FIG. 1 is a front view of the joystick according to the present invention.
Figure 2:
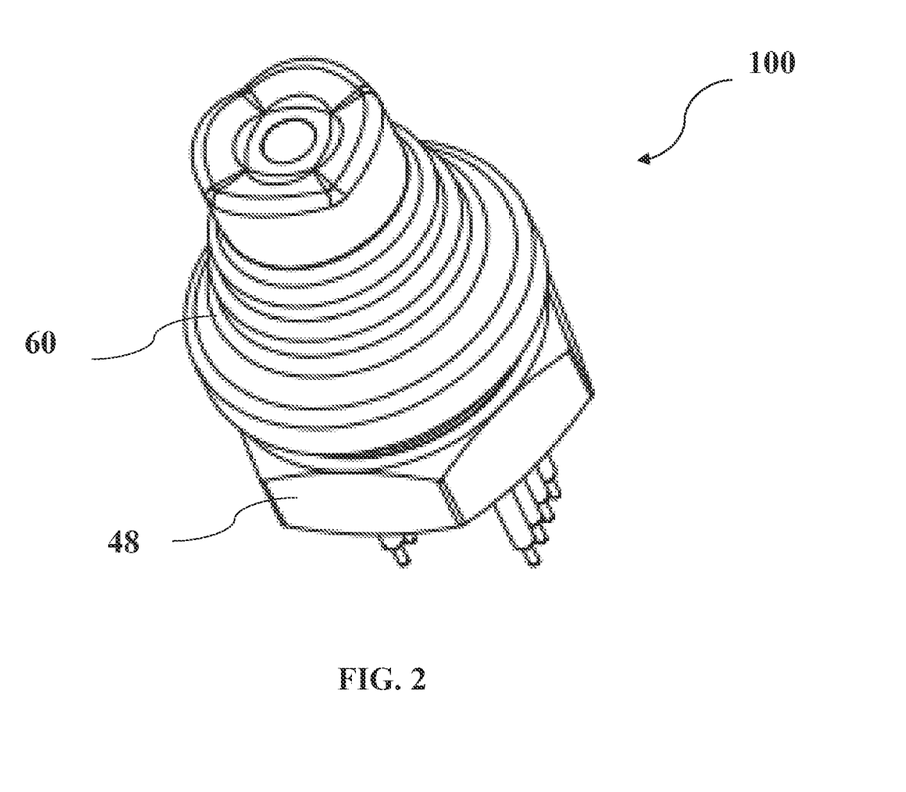
FIG. 2 is a front view of the joystick according to the present invention.

Hereinafter, preferred embodiments of the present invention will be described in detail with reference to the accompanying drawings which are given solely for the purpose of exemplifying embodiments according to the present invention. The list of reference numerals used in the appended drawings are as follows, 10. Top portion
20. Magnetic member
30. Control portion
32. Spring
33. Fastening member
34. Fastening cap
35. Abutment plate
351 Protrusion
39. Pivotal member pin
40. Pivotal member
41. Body
411 Recess
412 Hole
413 Inner wall
414 Outer wall
415 Protrusion
416 Outer protrusion
44. Circuit board
441 Hole
45. Sealing Plate
451 Upper portion
452 Lower portion
453 Recess
454 Protrusion
455 Hole
46. Fastening member
47. Sensor
48. Fixing member
60. Flexible boot
63. Spring house
80. Control arm
81. Fastening hole
82. Connection hole
83. Central opening
85 Fixing hole
100. Joystick
110. Attachment plate
200. Epoxy-based composite The present invention is directed to a joystick (100) that permits to control the direction of a machine in multiple-axis. According to one aspect of the present disclosure, the joystick (100) enabling to be used in multi axes comprises a control portion (30) having a body (41) in which at least one circuit board (44) having at least one sensor (47) is provided; a top portion (10) having a flexible boot (60) forming at least partly an outer periphery of the top portion (10) provided on the control portion (30); and a control arm (80) mounted on a pivotal member (40) for pivotal movement relative to the body (41); and further comprises wherein said control arm (80) is made of plastic in an injection-molding operation and has an overmolded magnetic member (20) suitable to interact with the sensor (47), said magnetic member (20) provided in the proximity of the circuit board (44) wherein said control arm (80) has a connection portion such that said flexible boot (60) is attached to the control arm (80) from said connection portion a shown in FIG. 1 and FIG. 2.

It should be understood that, it is difficult to make mechanical processes on a control arm (80) made of metal. Post-manufacturing of said control arm (80) requires additional processes such as deburring and chip removal. The most problematic situation is that precise hole drilling is mandatory in order to accommodate a pin. The attaching of the magnetic member (20) to metal process includes hole drilling suitable for magnetic member (20) at the end of the control arm (80). Accordingly, when the control arm (80) is made of metal, the magnetic member (20) is attached to the metal in a process after the manufacture of the metal arm.

It can be seen that, to overcome these difficulties, the present invention proposes a control arm (80) made of plastic in an injection molding operation and which has an overmolded magnetic member (20). Incorrect signals generated by vibrations are prevented so as to gain excellent motion control. Another advantage provided by this invention is that usage of the overmolded control arm (80) which made of plastic offers sensitivity, production quality and additionally, thriving resistance to vibration. Further, by virtue of production by molding, control arm (80) is always produced with the same quality. In addition, the magnet position remains constant and the accuracy is equally obtained. On the ground that, the additional operational processes required to attach the magnetic member (20) to the metal sleeve are avoided, the manufacturing is easier and the production cost is reduced.

During the injection process, the magnetic member (20) is placed in the injection mold and the injection process of the control arm (80) including fastening hole (81) and connection hole (82) are created at the same time in the injection mold. In a preferred embodiment, the overmolded magnetic member (20) is completely embedded within the control portion (30) and said magnetic member (20) is, preferably, a temperature-resistive magnet suitable to be used in an injection-molding operation.

Reference in this specification to 'one embodiment' or 'an embodiment' means that a particular feature, structure described in connection with the embodiment is included in at least one embodiment of the invention. The appearances of the phases "in one embodiment" in various places in the specification are not necessarily all referring to the same embodiment, nor are separate or alternative embodiments mutually exclusive of the other embodiments.

Figure 5:
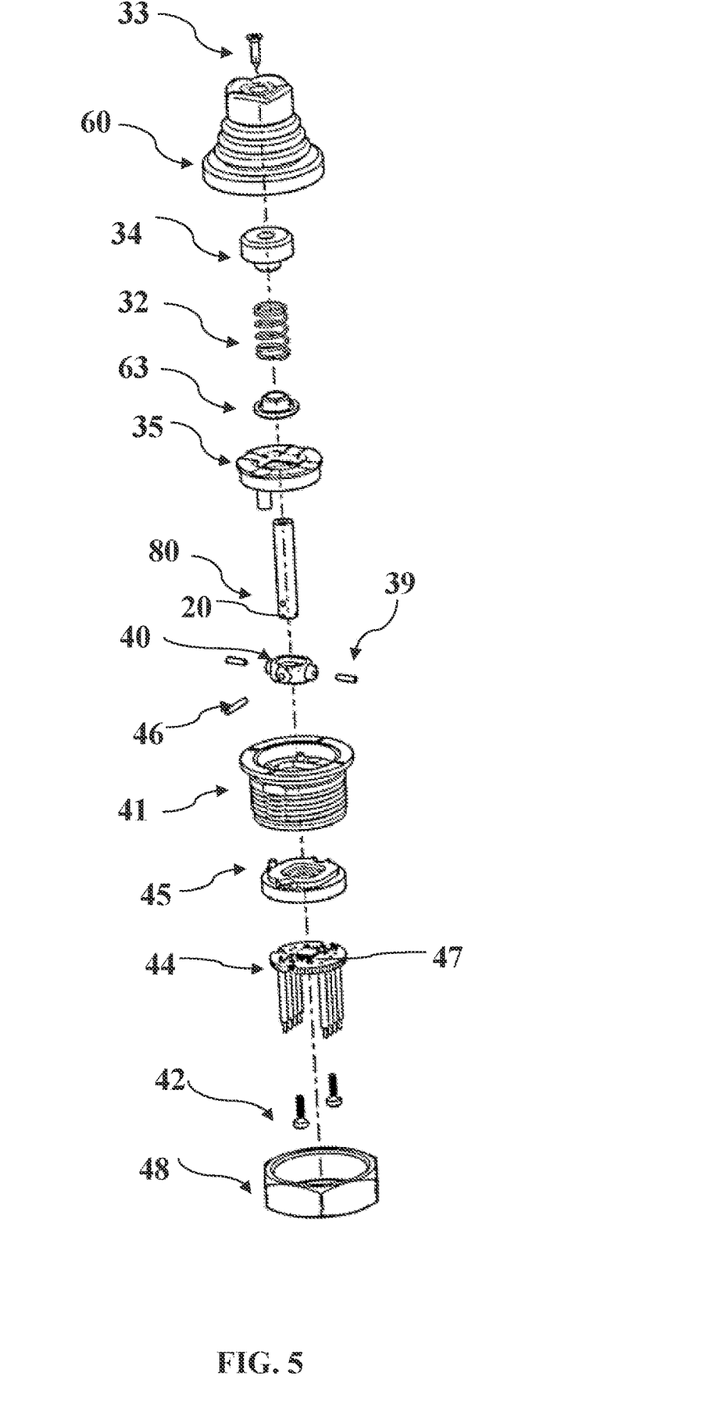
FIG. 5 is an exploded view of the joystick according to the present invention.
Figure 6A:
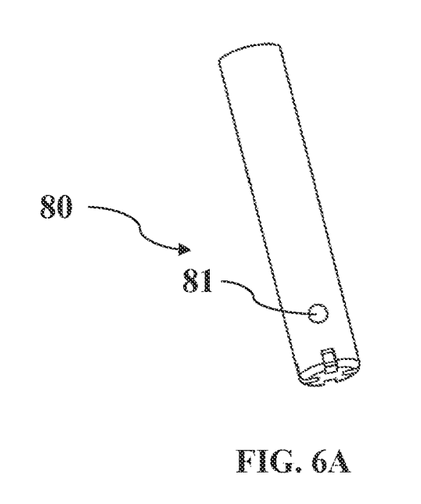
FIG. 6A is a perspective view of the control arm, according to the present invention.
Figure 6B:
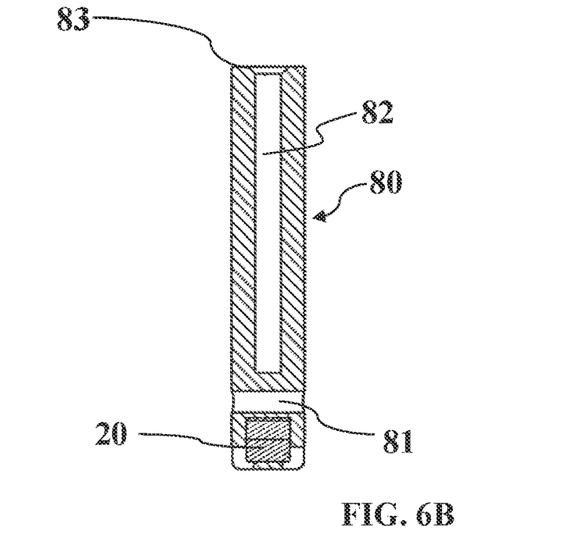
FIG. 6B is a partial cross-sectional view of the control arm, according to the present invention.

Referring now to the features specific to one embodiment of FIGS. 5, 6A, and 6B, the connection portion can be a connection hole (82), produced by said injection-molding operation, extending along a longitudinal direction of the control arm (80) for receiving a portion of a fastening member (33) which is arranged secure the control arm (80) and the flexible boot (60) together. Furthermore, said connection hole (82) can be a blind hole and can be formed with a central opening (83) having a larger diameter than the connection hole (82) for securing the flexible boot (60) tightly.

Figure 9:
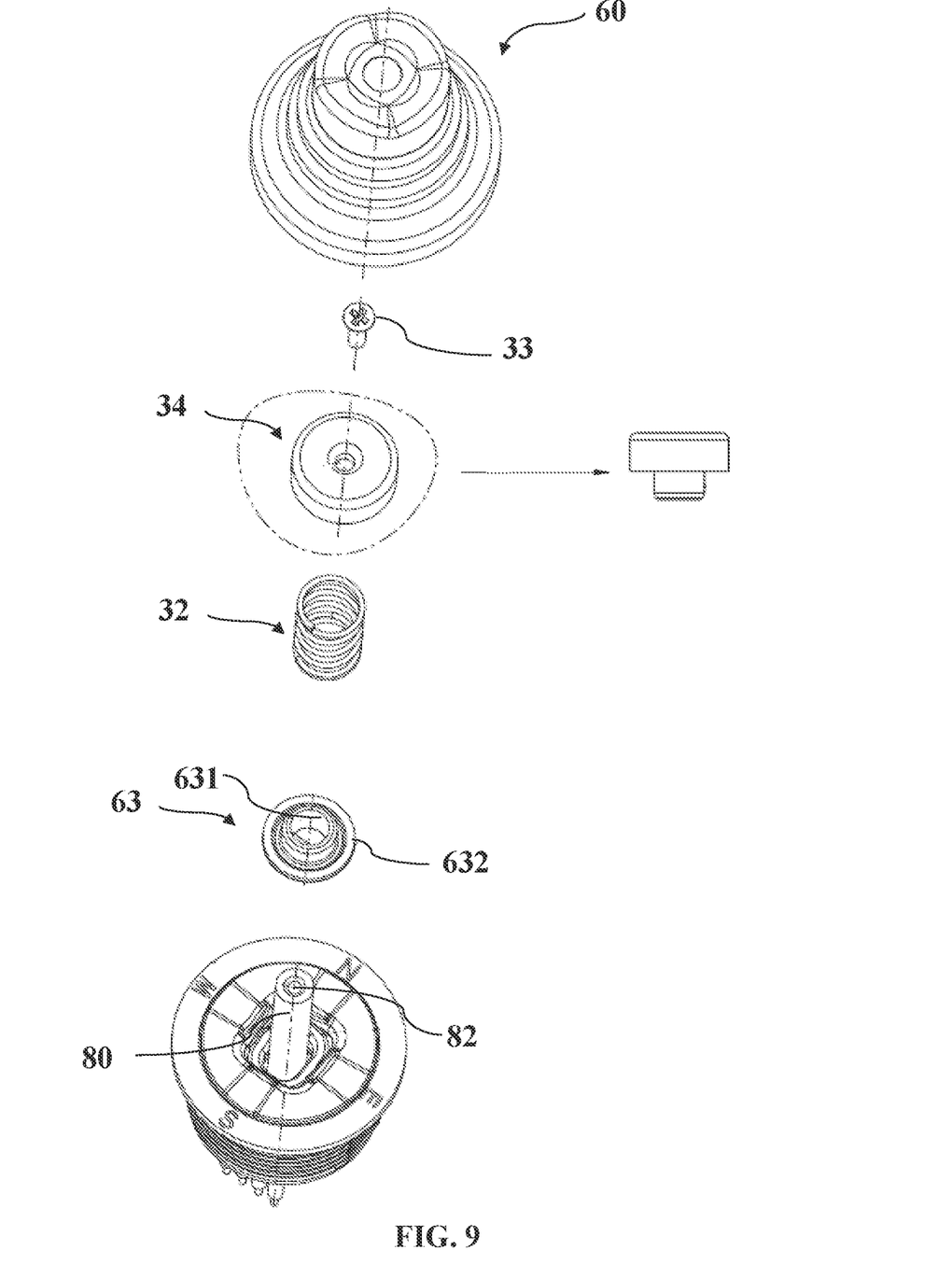
FIG. 9 is a partial exploded view of the joystick according to the present invention.

As illustrated in FIG. 5 and FIG. 9, the joystick (100) can comprise a fastening cap (34) placed between the fastening member (33) and the control arm (80), said fastening cap (34) having a hole through which the fastening member (33) can pass and further having a lower surface arranged to press against a portion (i.e, corrugated portion) of the flexible boot (60).

In an embodiment according to present inventions, the control arm (80) has a fastening hole (81) as a through hole which is produced at the same time by said injection-molding operation of the control arm (80). Favorably, said fastening hole (81) is provided in a direction which is substantially perpendicular with respect the longitudinal axis of the control arm (80) wherein said fastening member (46) is arranged to pass through said fastening hole (81) and at least one fixing hole (85) of the pivotal member (40). Thus, thanks to the fastening hole (81) corresponding to the fastening member (46) and the fixing hole (85) corresponding to fastening member (46) is also prevented which in result a more secure joystick is achieved.

Figure 8:
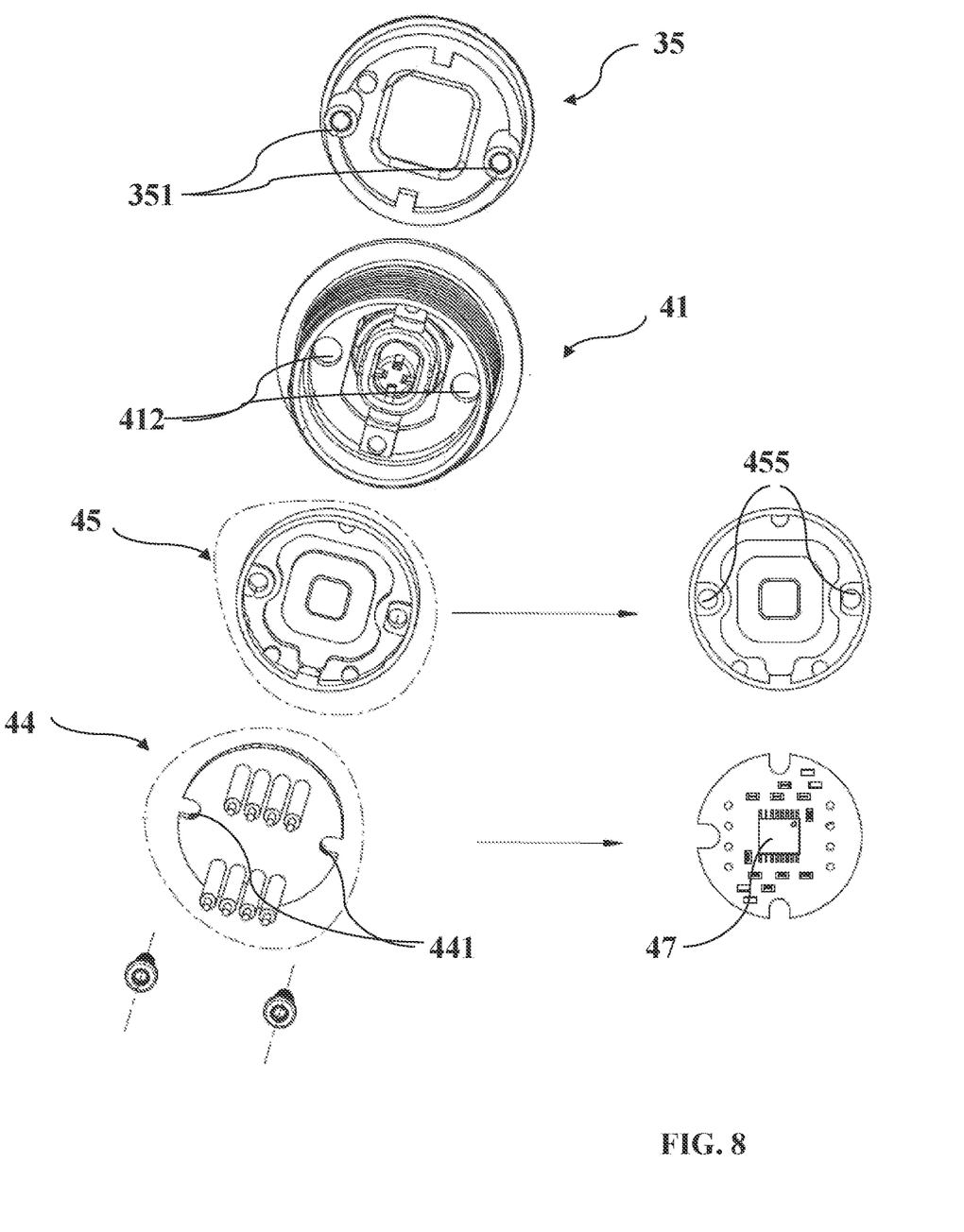
FIG. 8 is exploded view of the body, a circuit board and a friction member according to the present invention.
Figure 10A:
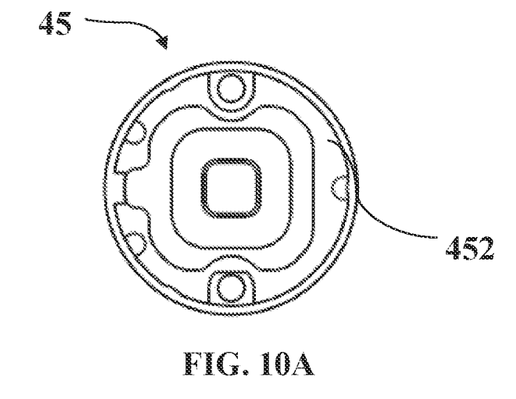
FIG. 10A is a top view of the rear surface of the sealing plate according to the present invention.
Figure 10B:
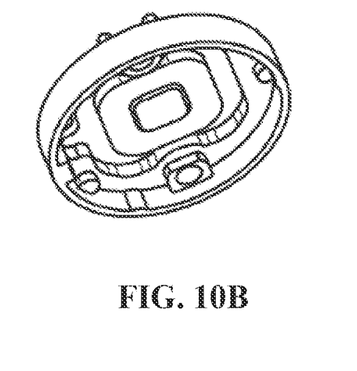
FIG. 10B is a perspective view of the sealing plate according to the present invention.
Figures 10C, 10D:
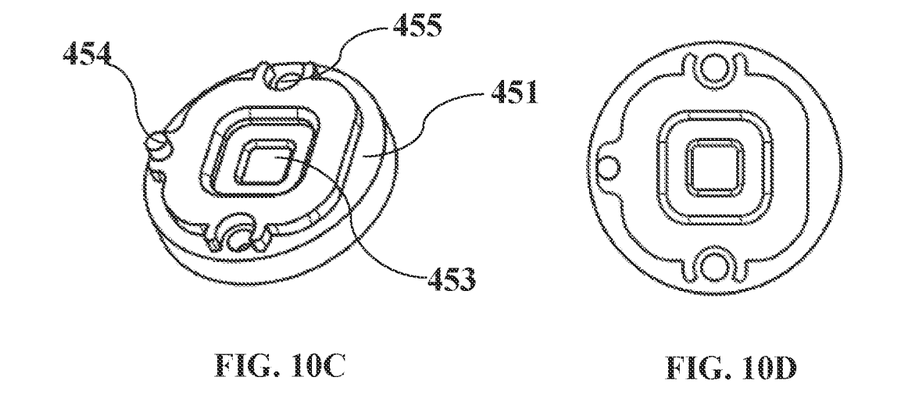
FIG. 10C is a perspective view of the sealing plate according to the present invention.
FIG. 10D is a top view of the sealing plate according to the present invention.
Figure 10E:
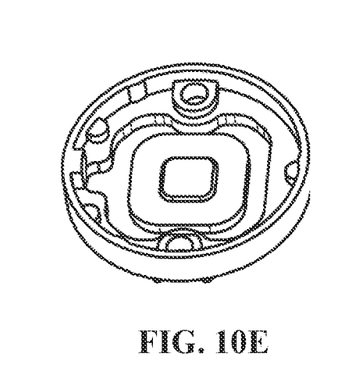
FIG. 10E is a perspective view of the rear surface of the sealing plate according to the present invention.

In general, the joystick (100) may involve flexible boots (60) such as bellows for protection. However, over time, flexible material shows deformations and begin to leak, thereafter the control arm (80) and the circuit board (44) may become inoperable. For the purpose of overcoming this problem, as shown in FIG. 8, a sealing plate (45) is provided on the circuit board (44) for attaining insulation wherein a sealing plate (45) which shaped and dimensioned to match with the circuit board (44) is used for sealing the circuit board (44). Preferably, said sealing plate (45) has an upper portion (451) with at least one recess (453) and at least one protrusion (454) facing the control arm (80) wherein a lower portion (452) of the sealing plate (45) is sized and shaped with respect to the circuit board (44) for enabling tightly fixed to the body (41), as shown in FIGS. 10A and 10B. Furthermore, said sealing plate (45) can comprise at least one hole (455) which is aligned with a hole (441) in the circuit board (44) and a hole (412) in the body (41) for fastening as illustrated in FIG. 10C. Accordingly, there is provided fully sealing wherein a volume of the control portion (30) at least partly defining the bottom of the control portion (30) is filled with epoxy-based material (200) shown in FIG. 5 so as to provide complete sealing thereof. Mainly the advantages provided by these embodiments are that the sealing plate (45) placed firmly on the circuit board (44) provides water and dust protection. In case of abrasion on the flexible boot (60); thanks to the presence of the sealing plate (45), the joystick (100) continues to operate in an efficient manner without being affected by the water and dirt in the outdoor environment.

Figure 11:
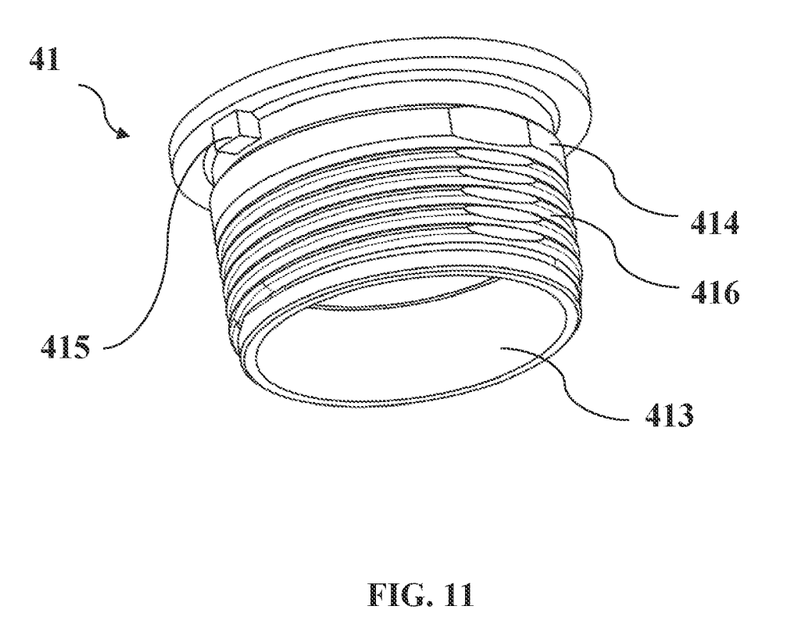
FIG. 11 is a perspective view showing the protrusions of the body, according to the present invention.

Referring to FIG. 11, the body (41) having an inner wall (413) and outer wall (414), at least one recess (411) corresponding to pivotal member pin (39), at least one hole (412) shaped and formed corresponding to a protrusion (351) of an abutment plate (35), at least one protrusion (415) disposed on the outer wall (414) with interacts with flexible boot (60) and lastly, outer protrusion corresponding to a fixing member (48). With this arrangement, the joystick (100) is ensconced tightly on the related part in the machine controlled by the user, thus the durable mechanical design is provided.

Figure 3:
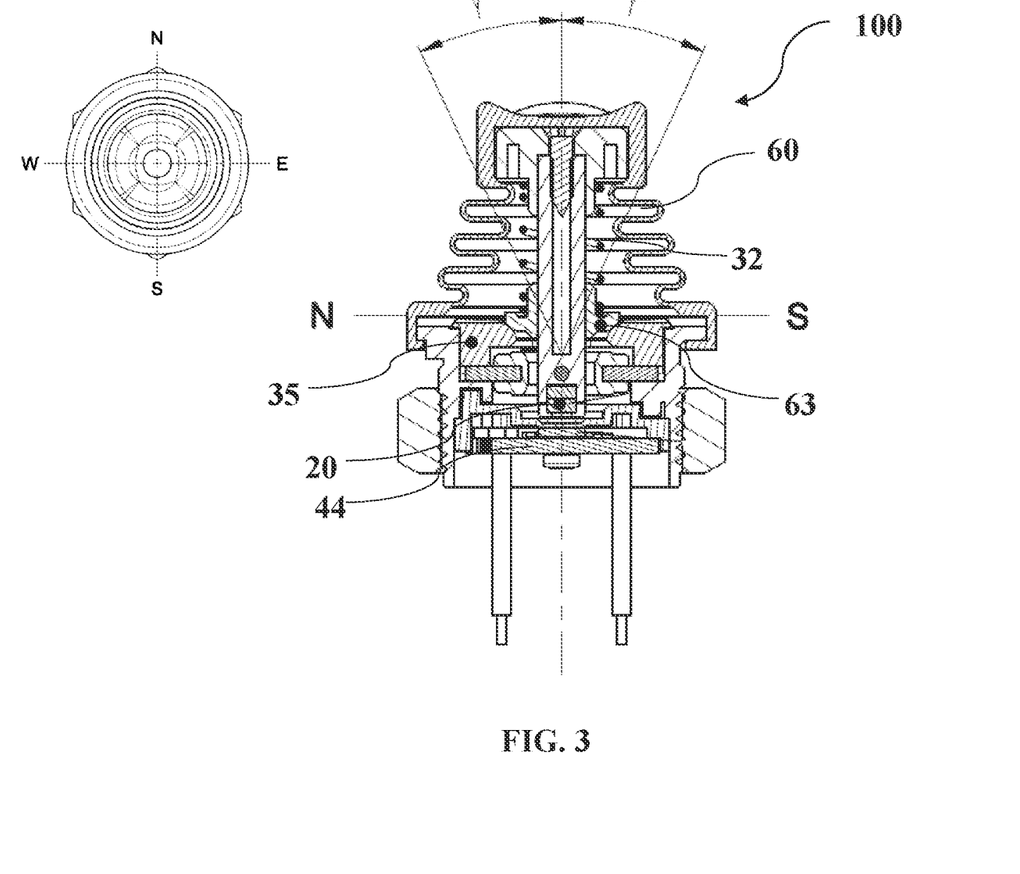
FIG. 3 is a cross-sectional view of the joystick according to the present invention.
Figure 4:
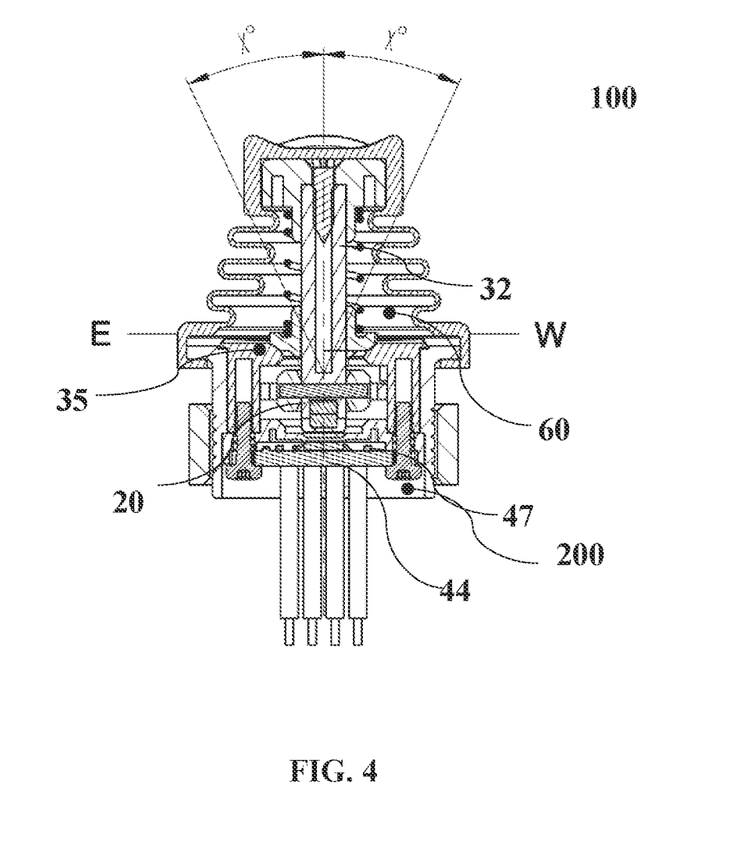
FIG. 4 is a cross-sectional view of the joystick according to the present invention.

In the example provided, said circuit board (44) is provided with at least one Hall effect sensor (47) which allows for a magnetic and non-contact operation on circuit board (44) wherein said circuit boards are generally a printed circuit boards Whilst in this embodiment there is no provision for more than one Hall sensor (47), this may be provided for in some embodiments by attaching additional Hall sensor (47) on the circuit board (44). Said circuit board (44) preferably has two separate sensors (47) to control the motion more precisely, such that one sensor (47) controls North-South motion, and the other controls the East-West motion as shown in FIGS. 3 and 4. Thanks to separate sensors (47), it provides increased security achieved by means of sensor (47) abundance.

Figure 7:
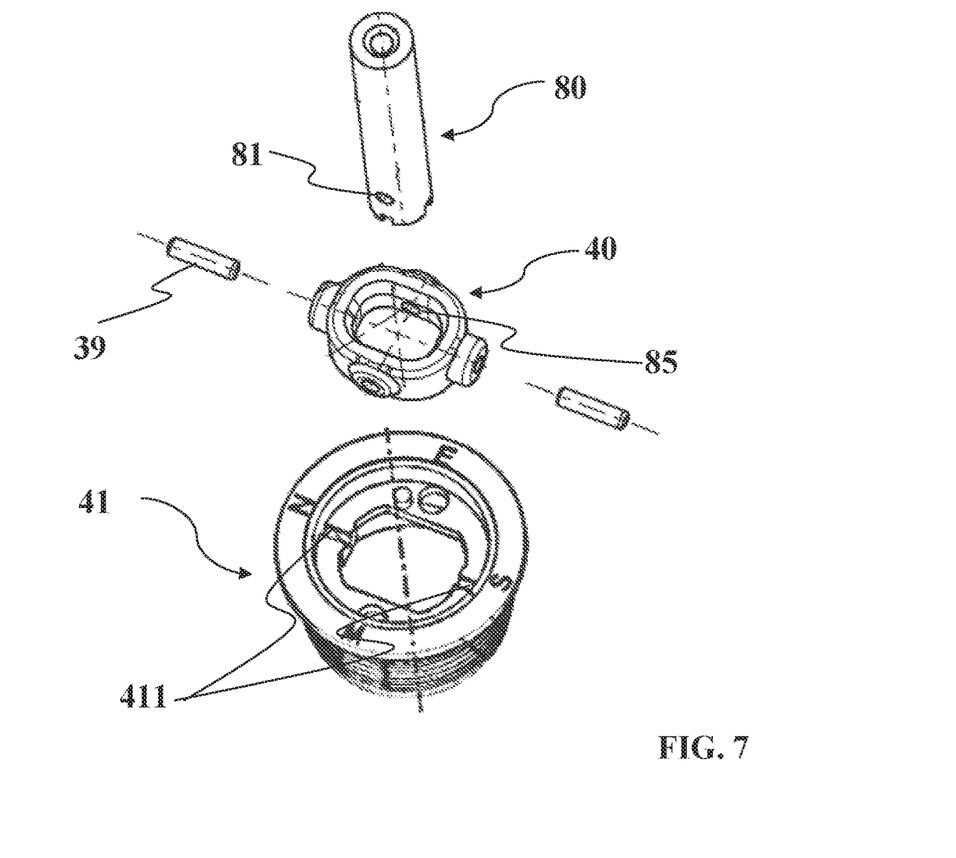
FIG. 7 is a partial exploded view of the control arm, a body and a pivotal member.

As illustrates in FIG. 6 and FIG. 7, the pivotal member (40) having at least one aperture (401) for pivotal member pin (39) is arranged to match with corresponding recess (411) of the body (41) wherein the pivotal member (40) is attached to the control arm (80) with fastening member (46).

The abutment plate (35) having at least one protrusion (351) shaped and sized to match with the corresponding hole (412) of the body (41) is attached to the inner volume of the body (41) to be on pivotal member (40) and spring house (63) provided on said abutment plate (35) into which said control arm (80). In a preferred embodiment, sealing plate (45) having at least one hole (455) corresponding to extending elongated protrusion (351) of the abutment plate (35) further comprises a recess (453) shaped and dimensioned to match with the one end of the control arm (80).

In accordance with another aspect of the present invention, the joystick (80) has a spring (32) located between the fastening cap (34) and spring house (63) provided on the abutment plate (35) through which the control arm (80) passes wherein at least one spring (32) is provided on the control arm (80), a proximal end of said spring (32) is guided on the spring house (63) and a distal end of said spring (32) is guided on a portion of the fastening cap (34). The spring house (63) having an inner friction surface (631) comprises an elongated protrusion (632) for locating spring (32) in addition to a hollow body through which the control arm (80) passes.

Referring to FIG. 9, fastening cap (34) having a hollow body aligned to match with the fastening member (33) which sized and shaped to match corresponding inner wall (413) of the flexible boot (60) further comprises wherein said flexible boot (60) is attached to the outer protrusion of body (416) so as to protect the top portion (10) against the contaminant. The spring house (63) and the fastening cap (34) have different inner diameters with respect to each other such that a more compact system durable to unfavorable environmental condition can be obtained.

What is claimed is:

1. A joystick for controlling a machine in multi-axes, comprising:
    a control portion having a body, wherein at least one circuit board having at least one sensor is provided in the body;
    a top portion having a flexible boot, wherein the flexible boot forms at least partly an outer periphery of the top portion provided on the control portion; and
    a control arm mounted on a pivotal member for a pivotal movement relative to the body;
    wherein the control arm is made of plastic in an injection-molding operation and has an overmolded magnetic member suitable to interact with the at least one sensor;
    the overmolded magnetic member is provided in proximity with the at least one circuit board;
    the control arm has a connection portion such that the flexible boot is attached to the control arm from the connection portion; and the connection portion is a connection hole, wherein the connection hole is created by the injection-molding operation and extends along a longitudinal direction of the control arm for receiving a portion of a fastening member, and the fastening member is arranged to secure the control arm and the flexible boot together.

2. The joystick according to claim 1, wherein the connection hole is a blind hole and is formed with a central opening having a larger diameter than the connection hole for securing the flexible boot.

3. The joystick according to claim 2, further comprising a sealing plate, wherein the sealing plate is shaped and dimensioned to match with the at least one circuit board and to provide a sealing in the at least one circuit board.

4. The joystick according to claim 1, further comprising a sealing plate, wherein the sealing plate is shaped and dimensioned to match with the at least one circuit board and to provide a sealing in the at least one circuit board.

5. The joystick according to claim 4, wherein the sealing plate has an upper portion with at least one recess and at least one protrusion facing the control arm, wherein a lower portion of the sealing plate is sized and shaped with respect to the at least one circuit board.

6. The joystick according to claim 5, wherein the sealing plate further comprises at least one hole aligned with respect to a hole in the at least one circuit board and a hole in the body for fastening.

7. The joystick according to claim 4, wherein the sealing plate further comprises at least one hole aligned with respect to a first hole in the at least one circuit board and a second hole in the body for fastening.

8. The joystick according to claim 1, wherein the overmolded magnetic member is completely embedded within the control portion and is a temperature-resistive magnet suitable to be used in the injection-molding operation.

9. The joystick according to claim 1, further comprising a fastening cap placed between the fastening member and the control arm, wherein the fastening cap has a hole, the fastening member passes through the hole, and the fastening cap further has a lower surface arranged to press against a portion of the flexible boot.

10. The joystick according to claim 9, further comprising a spring house provided on an abutment plate, the control arm passes through the abutment plate, wherein at least one spring is provided on the control arm, a proximal end of the at least one spring is guided on the spring house and a distal end of the at least one spring is guided on a portion of the fastening cap.

11. The joystick according to claim 1, wherein the control arm has a fastening hole as a through hole, wherein the fastening hole is created at the same time by the injection-molding operation of the control arm.

12. The joystick according to claim 11, wherein the fastening hole is provided in a direction substantially perpendicular with respect a longitudinal axis of the control arm, wherein the fastening member is arranged to pass through the fastening hole and at least one fixing hole of the pivotal member.

13. The joystick according to claim 1, wherein a lower volume of the control portion at least partly defining the bottom of the control portion is filled with an epoxy-based material so as to provide complete a sealing of the control portion.

14. The joystick according to claim 1, further comprising at least one Hall effect sensor configured to sense a displacement of the overmolded magnetic member, wherein the at least one Hall effect sensor allows for a magnetic and non-contact operation on the at least one circuit board.

15. The joystick according to claim 1, wherein the at least one circuit board further comprises two separate sensors, wherein each sensor of the two separate sensors is a Hall effect sensor configured to sense a displacement of the overmolded magnetic member in the multi-axes.

16. A joystick for controlling a machine in multi-axes, comprising:
- a control portion having a body, wherein at least one circuit board having at least one sensor is provided in the body;
- a top portion having a flexible boot, wherein the flexible boot forms at least partly an outer periphery of the top portion provided on the control portion; and
- a control arm mounted on a pivotal member for a pivotal movement relative to the body;
- wherein the control arm is made of plastic in an injection-molding operation and has an overmolded magnetic member suitable to interact with the at least one sensor;
- the overmolded magnetic member is provided in proximity with the at least one circuit board; and
- the body has an inner wall and an outer wall, at least one hole corresponding to a pivotal member pin, at least one recess shaped and formed corresponding to a protrusion of an abutment plate, at least one protrusion provided on an outer surface the outer wall.

\* \* \* \* \*